United States Patent
Park

(10) Patent No.: US 7,410,210 B2
(45) Date of Patent: Aug. 12, 2008

(54) SUPPORTING STRUCTURE OF ROOF CORNER FOR LARGE VEHICLE

(75) Inventor: Seung Young Park, Jeonbuk (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/706,752

(22) Filed: Feb. 14, 2007

(65) Prior Publication Data

US 2008/0136218 A1 Jun. 12, 2008

(30) Foreign Application Priority Data

Dec. 6, 2006 (KR) .................... 10-2006-0123067

(51) Int. Cl.
*B60J 7/00* (2006.01)

(52) U.S. Cl. .................................. 296/210

(58) Field of Classification Search ............... 296/210, 296/1.01, 187.11, 203.01, 203.03, 29, 30, 296/205, 143, 178; 403/217
See application file for complete search history.

(56) References Cited

U.S. PATENT DOCUMENTS

| | | | | |
|---|---|---|---|---|
| 2,075,096 A | * | 3/1937 | Crommey | 296/210 |
| 2,427,649 A | * | 9/1947 | Theriault | 296/178 |
| 2,779,864 A | * | 1/1957 | Eichner | 362/484 |
| 3,061,364 A | * | 10/1962 | Tantlinger et al. | 296/210 |
| 3,355,210 A | * | 11/1967 | Cripe | 296/208 |
| 4,212,405 A | * | 7/1980 | Schmidt | 296/182.1 |
| 4,991,897 A | * | 2/1991 | Karapetian | 296/29 |
| 5,143,416 A | * | 9/1992 | Karapetian | 296/29 |
| 5,422,794 A | * | 6/1995 | Drake | 362/471 |
| 5,518,448 A | * | 5/1996 | Madoglio et al. | 454/108 |
| 6,241,186 B1 | * | 6/2001 | Calnon | 244/118.5 |
| 6,334,642 B1 | * | 1/2002 | Waldeck et al. | 296/29 |
| 6,485,078 B1 | * | 11/2002 | Lim | 296/37.7 |
| 6,991,276 B2 | * | 1/2006 | McCauley et al. | 296/37.7 |
| 7,219,952 B2 | * | 5/2007 | Taylor | 296/182.1 |

FOREIGN PATENT DOCUMENTS

| | | |
|---|---|---|
| JP | 10-071963 | 3/1998 |
| KR | 100145017 | 7/1997 |
| KR | 10-2001-0087454 | 9/2001 |
| KR | 10-2002-0040279 | 5/2002 |

* cited by examiner

*Primary Examiner*—Kiran B. Patel
(74) *Attorney, Agent, or Firm*—Peter F. Corless; Edwards Angell Palmer & Dodge LLP

(57) ABSTRACT

The present invention provides a supporting structure of a roof corner for a large vehicle in which the roof corner includes a roof structure and a side structure connected to the roof structure, the supporting structure comprising a reinforcing member coupled to the roof structure and the side structure for supporting the roof corner and minimizing deformation of the roof corner in the event of vehicle overturn.

3 Claims, 3 Drawing Sheets

SUPPORTING STRUCTURE OF ROOF CORNER FOR LARGE VEHICLE

CROSS-REFERENCE TO RELATED APPLICATION

This application claims priority to and the benefit of Korean Patent Application No. 10-2006-0123067 filed in the Korean Intellectual Property Office on Dec. 6, 2006, the entire contents of which are incorporated herein by reference.

BACKGROUND OF THE INVENTION (a) Field of the Invention

The present invention relates to a supporting structure of a roof corner for a large vehicle, and more particularly to a supporting structure of a roof corner for a large vehicle in which a reinforcing member is coupled to a roof corner so as to enhance supporting rigidity thereby maximizing a passenger survival space in the event of vehicle overturn.

(b) Background Art

FIG. 1 is a drawing showing deformation of a roof corner of a conventional large vehicle when the vehicle experiences overturn.

As shown in FIG. 1, in the event that the vehicle experiences overturn, impact load may act on a roof corner C. As a result, the roof may be deformed from state A to state B, and a passenger survival space may be invaded by a vehicle body structure.

For a conventional large vehicle, in order to prevent the passenger survival space from being invaded, a reinforcing member has been diagonally coupled to a portion of the pillar of the vehicle and a portion of the floor.

However, since assembling tolerance in the application of the reinforcing member to a large vehicle varies depending on kinds and types of vehicles, an additional margin is required.

In such conventional structure, a roof structure and a side structure are connected only by welding, so the connection part may be easily deformed by external impact. Accordingly, there is a need for a structure for minimizing such deformation.

SUMMARY OF THE INVENTION

The present invention has been made in an effort to provide a supporting structure of a roof corner for a large vehicle having an advantage of maximizing a passenger survival space in the event of vehicle overturn by coupling a reinforcing member to a roof corner.

The present invention has also been made in an effort to provide a supporting structure of a roof corner for a large vehicle in which an insertion part is formed in the reinforcing member such that a shelf board can be coupled, so as to increase a supporting rigidity and to minimizing deformation by impact load acting on a roof corner.

In one aspect, the present invention provides a supporting structure of a roof corner for a large vehicle in which the roof corner includes a roof structure and a side structure connected to the roof structure, the supporting structure comprising a reinforcing member coupled to the roof structure and the side structure for supporting the roof corner and minimize deformation of the roof corner in the event of vehicle overturn.

In a preferred embodiment, reinforcing member may comprise two end portions and a bent portion between the two end portions, one end of the reinforcing member being fixed to the roof structure and the other end of the reinforcing member being fixed to the side structure.

The reinforcing member may suitably be provided with a round part inside the bent portion so as to enhance bending rigidity.

Preferably, a lower side of the reinforcing member may be provided with an insertion part both sides of which are indented in a length direction so as to support the shelf board.

Suitably, the two end portions of the reinforcing member may be inwardly rounded so as to face one another.

Also suitably, the reinforcing member and the insertion part may be formed, for example, by molding in a single body so as to enhance durability.

In such preferred embodiments, reinforcing member may be further provided with a round part inside the bent portion so as to enhance bending rigidity.

Figure 1:
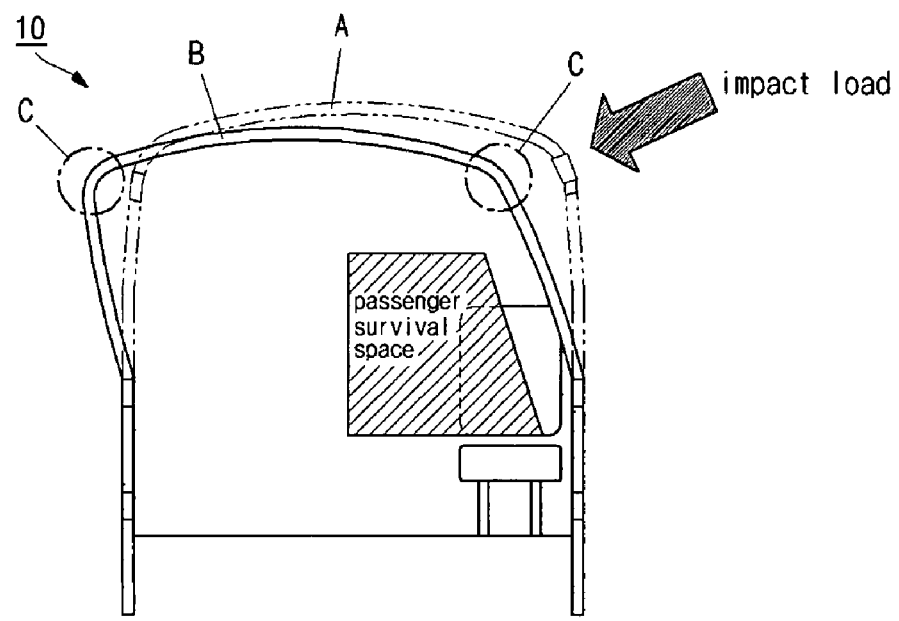
FIG. 1 is a drawing showing deformation of a roof corner of a conventional large vehicle in the event of vehicle overturn.

Reference numerals set forth in the Drawings includes reference to the following elements as further discussed below:

| | |
|---|---|
| 130: roof structure | 50: side structure |
| 70: shelf board | 100: reinforcing member |
| 110: round part | 130: insertion part |
| C: roof corner | |

DETAILED DESCRIPTION OF THE EMBODIMENTS

An exemplary embodiment of the present invention will hereinafter be described in detail with reference to the accompanying drawings.

Figure 2:
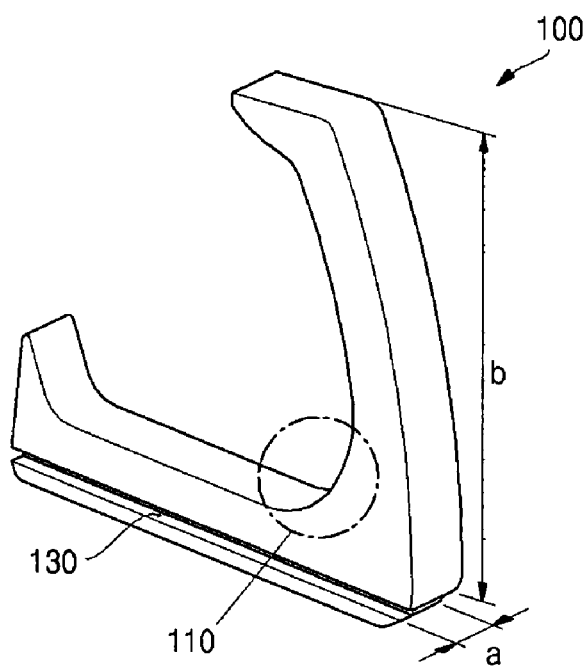
FIG. 2 is a drawing showing a supporting structure of a roof corner for a large vehicle according to an exemplary embodiment of the present invention.
Figure 3A:
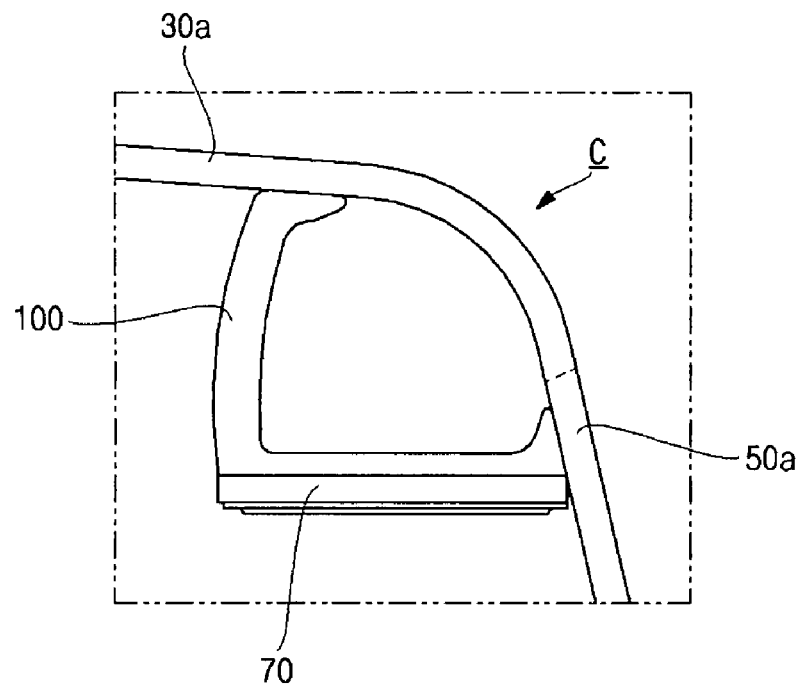
FIG. 3A is a drawing showing a roof corner to which a reinforcing member and a shelf board according to an exemplary embodiment of the present invention are installed.
Figure 3B:
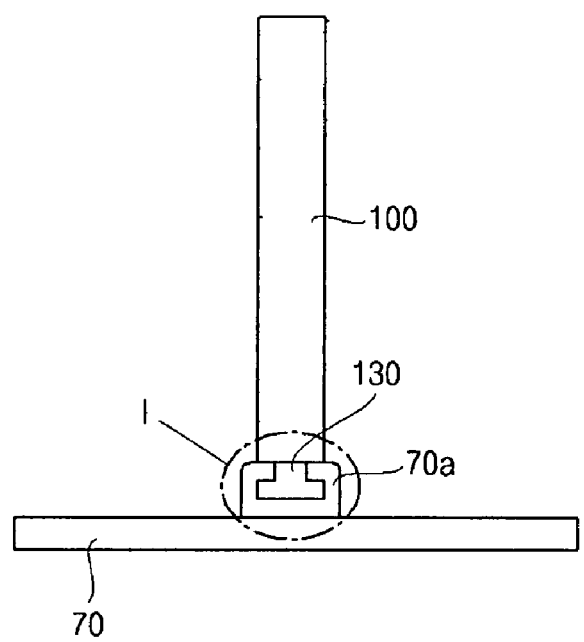
FIG. 3B is a drawing showing a side of a reinforcing member according to an exemplary embodiment of the present invention in a state that the shelf board is fitted into an insertion part of reinforcing member.
Figure 4:
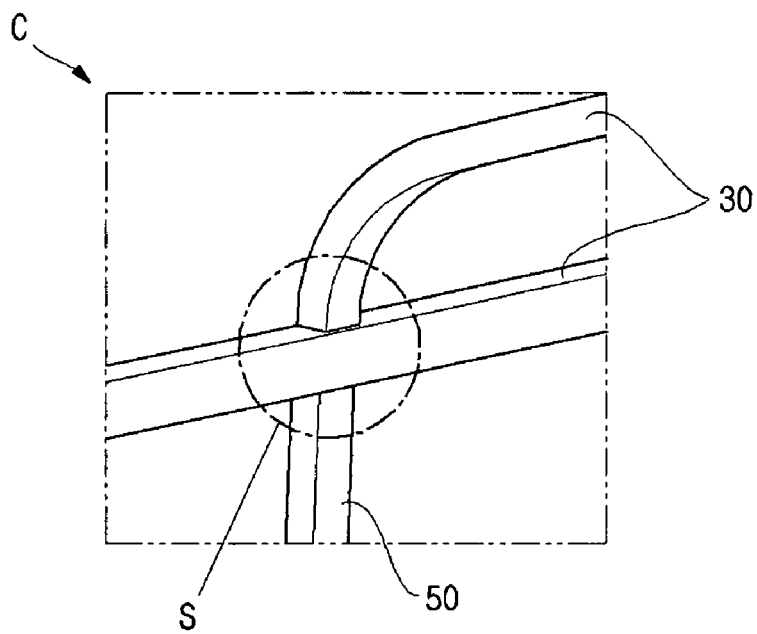
FIG. 4 is a drawing showing a roof corner to which a roof structure and a side structure according to an exemplary embodiment of the present invention are coupled.
Figure 5:
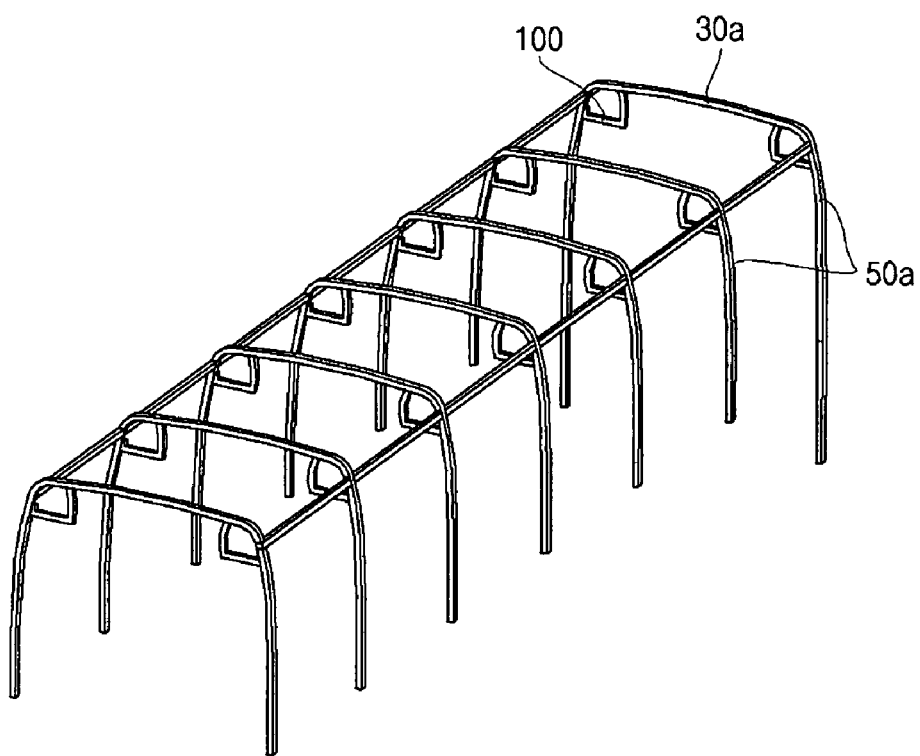
FIG. 5 is a drawing showing a state in which a reinforcing member according to an exemplary embodiment of the present invention is coupled to a roof corner.

FIG. 2 is a drawing showing a supporting structure of a roof corner for a large vehicle according to an exemplary embodiment of the present invention, FIG. 3A is a drawing showing a roof corner to which a reinforcing member and a shelf board according to an exemplary embodiment of the present invention are installed, FIG. 3B is a drawing showing a side of a reinforcing member according to an exemplary embodiment of the present invention in a state that the shelf board is fitted into an insertion part of reinforcing member, FIG. 4 is a drawing showing a roof corner to which a roof structure and a side structure according to an exemplary embodiment of the present invention are coupled, and FIG. 5 is a drawing showing a state in which a reinforcing member according to an exemplary embodiment of the present invention is coupled to a roof corner.

As shown in FIG. 2 to FIG. 5, a supporting structure of a roof corner for a large vehicle provides a reinforcing member to a roof structure and a side structure so as to increase a supporting rigidity of a roof corner C, in order to minimize deformation of the roof corner C of a large vehicle in subversion thereof.

A reinforcing member 100 is coupled to the roof corner C where a bow 30a of a roof structure 30 and a window pillar 50a of a side structure 50 join together.

The thickness of the reinforcing member 100 is a, and the width thereof is b. The reinforcing member 100 is coupled near a portion where the bow 30a and the window pillar 50a join together.

The reinforcing member 100 is coupled corresponding to the roof corner C, and has a shape of L. One end of the reinforcing member 100 is fixed to the bow 30a of the roof structure 30 and is downwardly extended and is then bent toward the side structure 50, and the extended other end thereof is fixed to the window pillar 50a of the side structure 50.

Both ends of the reinforcing member 100 are inwardly rounded to face one another, and are fixed at fixing locations by welding.

An inner side of the bent portion where parts extended from both ends forms a round part 110, and bending rigidity of the round part 110 of the reinforcing member 100 can be further enhanced by increasing the round part 110.

In addition, an insertion part 130 is formed on a lower side of a portion extended from the other end of the reinforcing member 100, and a shelf board 70 is to be coupled to the insertion part 130.

The insertion part 130 is formed at a lower side of the reinforcing member, and both sides are indented in a length direction. An inserting part 70a which is formed on the shelf board 70 is fitted into the insertion part 130.

The insertion part 130 of the reinforcing member 100 is formed by compression mold insert I with the inserting part 70a of the shelf board 70 to support the shelf board 70.

The reinforcing member 100 which is provided with the insertion part 130 is formed by molding in a single body, so the reinforcing member 100 has an enhanced durability.

The reinforcing member 100 of a supporting structure of a roof corner for a large vehicle according to an exemplary embodiment of the present invention may reduce impact load acting on the roof corner C during subversion of a large vehicle.

An assembling process of a supporting structure of a roof corner for a large vehicle according to an exemplary embodiment of the present invention will be described.

As shown in FIG. 3A to FIG. 5, in a vehicle body main buck process in an in-line assembling of a factory, after the roof structure 30 and the side structure 50 are coupled to one another by welding S, the reinforcing member 100 is fixed to mounting positions of the roof structure 30 and the side structure 50 by welding.

That is, the respective reinforcing members 100 are coupled to all portions where the bow 30a of the roof structure 30 and the window pillar 50a of the side structure 50 join together.

The inserting part 70a of the shelf board 70 is fitted into the insertion part 130 of the reinforcing member 100, so that the shelf board 70 can be coupled to the reinforcing member by compression mold insert I.

The reinforcing member 100 of a supporting structure of a roof corner for a large vehicle according to an exemplary embodiment of the present invention reinforces the roof structure 30 and the side structure 50, so that deformation of the roof corner C of a large vehicle can be minimized and this may cause an increase of a passenger survival space.

As described above, a supporting structure of a roof corner for a large vehicle according to an exemplary embodiment of the present invention may decrease impact load acting on the roof corner during subversion of a large vehicle.

Furthermore, the roof structure and the side structure can be reinforced, so that deformation of the roof corner can be minimized during subversion of a large vehicle, thereby increasing a passenger survival space.

Accordingly, safety of a passenger can be enhanced.

Still furthermore, efficiency in an assembling process can be enhanced, and the shelf board can be more easily coupled.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A supporting structure of a roof corner for a large vehicle in which the roof corner includes a roof structure and a side structure connected to the roof structure, the supporting structure comprising a reinforcing member coupled to the roof structure and the side structure for supporting the roof corner and minimizing deformation of the roof corner in the event of vehicle overturn, wherein:

the reinforcing member comprises two end portions and a bent portion between the two end portions, one end portion of the reinforcing member being fixed to the roof structure and the other end portion of the reinforcing member being fixed to the side structure;

the reinforcing member is provided with a round part inside the bent portion so as to enhance bending rigidity; and the reinforcing member is provided with an insertion part at a lower side thereof, the insertion part being indented in a length direction to support a shelf board.

2. The supporting structure of claim 1, wherein the two end portions of the reinforcing member are inwardly rounded to face one another.

3. The supporting structure of claim 2, wherein the reinforcing member and the insertion part are formed by molding in a single body to enhance durability.

* * * * *